United States Patent
Wang (10) Patent No.: US 10,042,827 B2
(45) Date of Patent: Aug. 7, 2018

(54) SYSTEM AND METHOD FOR RECOGNIZING NON-BODY TEXT IN WEBPAGE

(71) Applicant: BEIJING QIHOO TECHNOLOGY COMPANY LIMITED, Beijing (CN)

(72) Inventor: Zhigang Wang, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 135 days.

(21) Appl. No.: 14/411,013

(22) PCT Filed: Jun. 9, 2013

(86) PCT No.: PCT/CN2013/077102
§ 371 (c)(1),
(2) Date: Dec. 23, 2014

(87) PCT Pub. No.: WO2014/000571
PCT Pub. Date: Jan. 3, 2014

(65) Prior Publication Data
US 2015/0205769 A1    Jul. 23, 2015

(30) Foreign Application Priority Data
Jun. 25, 2012   (CN) .......................... 2012 1 0214385

(51) Int. Cl.
*G06F 17/20* (2006.01)
*G06F 17/22* (2006.01)
(Continued)

(52) U.S. Cl.
CPC ...... *G06F 17/2247* (2013.01); *G06F 17/2715* (2013.01); *G06F 17/30896* (2013.01)

(58) Field of Classification Search
CPC .................................................. G06F 17/2247
See application file for complete search history.

(56) References Cited

U.S. PATENT DOCUMENTS

| | | |
|---|---|---|
| 6,635,089 B1 * | 10/2003 | Burkett ............ G06F 17/30896 707/E17.118 |
| 2005/0144555 A1 * | 6/2005 | Morris ................ G06F 17/2247 715/234 |

(Continued)

OTHER PUBLICATIONS

International Search Report regarding PCT/CN2013/077102 dated Sep. 19, 2013, two pages.

(Continued)

*Primary Examiner* — Wilson Tsui
*Assistant Examiner* — Shahid Khan
(74) *Attorney, Agent, or Firm* — Polsinelli PC (57) ABSTRACT

The invention discloses a system and method for recognizing the non-body text in a webpage, and relates to the field of main body extraction. The system comprises: a webpage grabber configured to grab data of all the webpages of a target website; a DOM tree construction unit configured to construct a DOM tree corresponding to each webpage of the target website; a DOM tree analysis unit configured to find out a unit text section in the webpage according to the DOM tree; a text statistics unit configured to conduct statistics on the number of occurrence of the unit text section in all the webpages of the target website; and a text recognition unit configured to recognize the unit text section as a non-body text when the number of occurrence is greater than a predetermined threshold. The system and the method overcome the problem of lag of recognition of a non-body text in the prior art method, and have a high recognition accuracy.

9 Claims, 7 Drawing Sheets

(51) Int. Cl.
  *G06F 17/27*  (2006.01)
  *G06F 17/30*  (2006.01)

(56) References Cited

U.S. PATENT DOCUMENTS

2008/0263026 A1\* 10/2008 Sasturkar ............ G06F 17/2211
2009/0063500 A1  3/2009 Zhai et al.
2011/0302524 A1\* 12/2011 Forstall ............. G06F 17/30905
                  715/781

OTHER PUBLICATIONS

English translation of abstract only of Chinese application CN101251855A, Title: Equipment, system and method for cleaning internet web page, Publication Date: Jan. 28, 2010, Country: CN, Inventor(s): Gaolin Fang et al., one page.

English translation of abstract only of Chinese application CN102184189A, Title: Webpage core block determining method based on DOM (Document Object Model) node text density, Publication Date: Sep. 14, 2011, Country: CN, Inventor(s): Fei Sun et al., one page.

Meng J. et al, English translation of abstract only, Combing node frequency and semantic feature for webpage informative content extraction, Computer Engineering and Applications, 2009, vol. 45, No. 1, pp. 140-143.

\* cited by examiner

```
<div class="footer">
    <p>
        <a href="http://www.360.cn/about/index.html" target="_blank">About US</a>
        " | "
        <a href="http://www.360.cn/download.html" target="_blank">Product</a>
        " | "
        <a href="http://www.qihoo.com" target="_blank">Q&A</a>
        " | "
        <a href="http://www.360.cn/about/zhaopin.html" target="_blank">Career</a>
        " | "
        <a href="http://www.360.cn/about/contactus.html" target="_blank">Contact US</a>
        " | "
        <a href="http://bbs.360.cn/3237995.html" target="_blank">Advise</a>
        " | "
        <a href="http://www.360.cn/commend.html" target="_blank">Commend</a>
        " | "
        <a href="http://www.360.cn/custom/bdhezuo.html" target="_blank">Partner</a>
        <br>
        "Copyright@2005-2012 360.CN All Rights Reserved 360 SafeCenter"
        <br>
        <a href="http://www.miitbeian.gov.cn/ "target="_blank">JING ICP Certificate No.080047</a>
        "JING GongAn Record No.110000000006"
    </p>
</div>
```

Figure 1a

About US | Product | Q&A | Career | Contact US | Advise | Commend | Partner

Copyright@2005-2012 360.CN All Rights Reserved 360 SafeCenter

JING ICP Certificate No.080047 JING GongAn Record No.110000000006

SYSTEM AND METHOD FOR RECOGNIZING NON-BODY TEXT IN WEBPAGE

FIELD OF THE INVENTION

The invention relates to the field of main body extraction, and in particular, to a system and method for recognizing a non-body text in a webpage.

BACKGROUND OF THE INVENTION

Figure 1A:
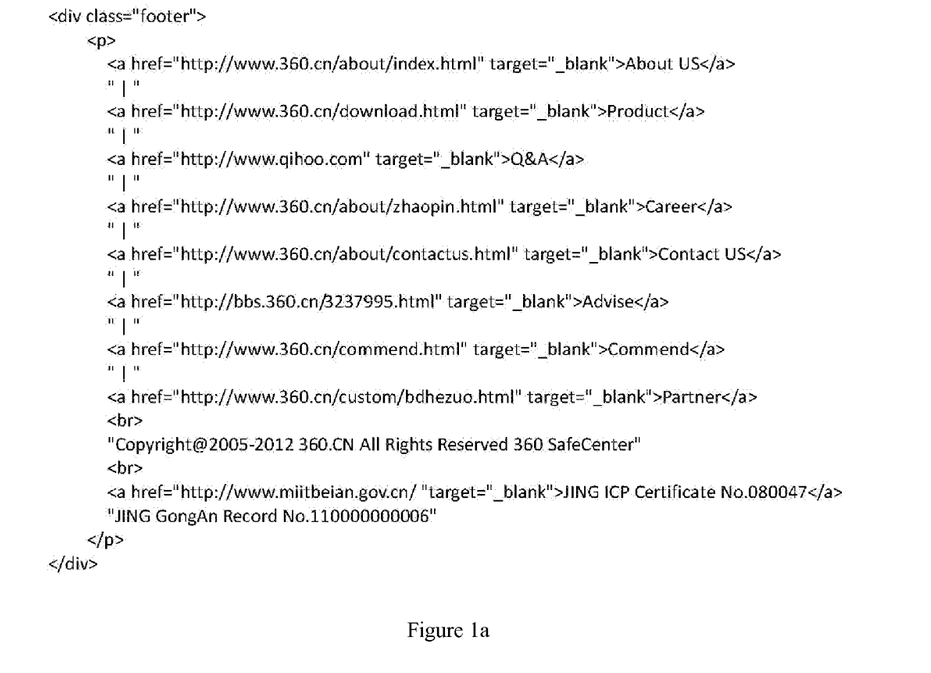
FIG. 1a is a schematic diagram of a code segment for a section of website statement.
Figure 1B:
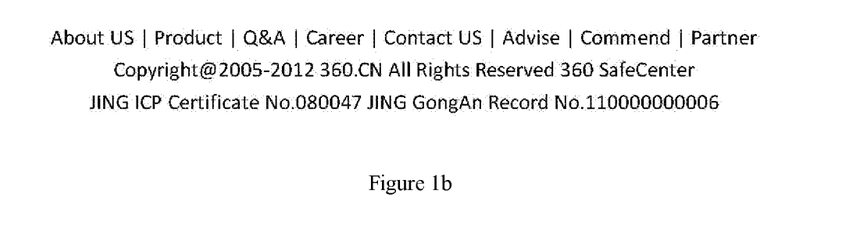

Main body extraction plays a more and more important role in a field of search engines, mobile reading, etc. Techniques commonly used in main body extraction are rule based, DOM (Document Object Model) tree based, mark window based, maximum text block based, etc. These methods all need to exclude non-body text in a website, such as an advertisement, a website statement, etc. What is shown in FIG. 1a is a schematic diagram of a code segment for a section of website statement, and FIG. 1b is a view of the actual display effect in a webpage of the code segment in FIG. 1a. Such website statements are very common in webpages, of little value for a user's reading, and need to be excluded upon main body extraction. However, how to effectively recognize these non-body texts is a challenge.

In the prior art, the method of garbage keyword density is primarily adopted to perform a non-body text recognition. When recognizing a non-body text based on a garbage keyword, it is necessary to have a dictionary composed of garbage keywords and constantly update the dictionary. For the update of the dictionary, a new garbage keyword can only be added after a problem is found. Therefore, such a method has a serious lag, and when facing a huge amount of data of the whole internet, such a lag appears to be more prominent.

SUMMARY OF THE INVENTION

In view of the above problems, the invention is proposed to provide a system and method for recognizing a non-body text in a webpage which overcome the above problems or at least in part solve or mitigate the above problems.

According to an aspect of the invention, there is provided a system for recognizing a non-body text in a webpage, which system comprises: a webpage grabber, a DOM tree construction unit, a DOM tree analysis unit, a text statistics unit and a text recognition unit; the webpage grabber is configured to grab data of all the webpages of a target website; the DOM tree construction unit is configured to construct a DOM tree corresponding to each webpage of the target website; the DOM tree analysis unit is configured to find out a unit text section in the webpage according to the DOM tree; the text statistics unit is configured to conduct statistics on the number of occurrence of the unit text section in all the webpages of the target website; and the text recognition unit is configured to recognize the unit text section as a non-body text when the number of occurrence is greater than a predetermined threshold.

According to another aspect of the invention, there is provided a method for recognizing a non-body text in a webpage, which comprises the steps of:

A: grabbing data of all the webpages of a target website by using a webpage grabber;

B: constructing a DOM tree corresponding to each webpage of the target website;

C: finding out a unit text section in the webpage according to the DOM tree;

D: conducting statistics on the number of occurrence of the unit text section in all the webpages of the target website; and E: judging whether the unit text section is a non-body text according to the number of occurrence.

Therein, in the step B, a DOM tree corresponding to each webpage of the target website is constructed by adopting a parser corresponding to the webpage language.

According to yet another aspect of the invention, there is provided a computer program comprising a computer readable code which causes a server to perform the method for recognizing a non-body text in a webpage according to any of the claims, when said computer readable code is running on the server.

According to still another aspect of the invention, there is provided a computer readable medium storing the computer program as claimed in the claims therein.

The beneficial effects of the invention lie in that:

In the system and method for recognizing a non-body text in a webpage according to embodiments of the invention, a DOM tree is adopted to obtain a unit text section of each webpage, statistics is in turn conducted on the number of occurrence of the unit text section in the target website, and its number of occurrence is compared with a predetermined threshold, thereby a non-body text in the website is recognized, which overcomes the problem of lag of recognizing a non-body text in the prior art method, has a high recognition accuracy, and has a wide application prospect in search engines.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings:

FIG. 1b is a view of the actual display effect in a webpage of the code segment in FIG. 1a;

DETAILED DESCRIPTION OF THE INVENTION

In the following the invention will be further described in connection with the drawings and the particular embodiments.

Figure 2:
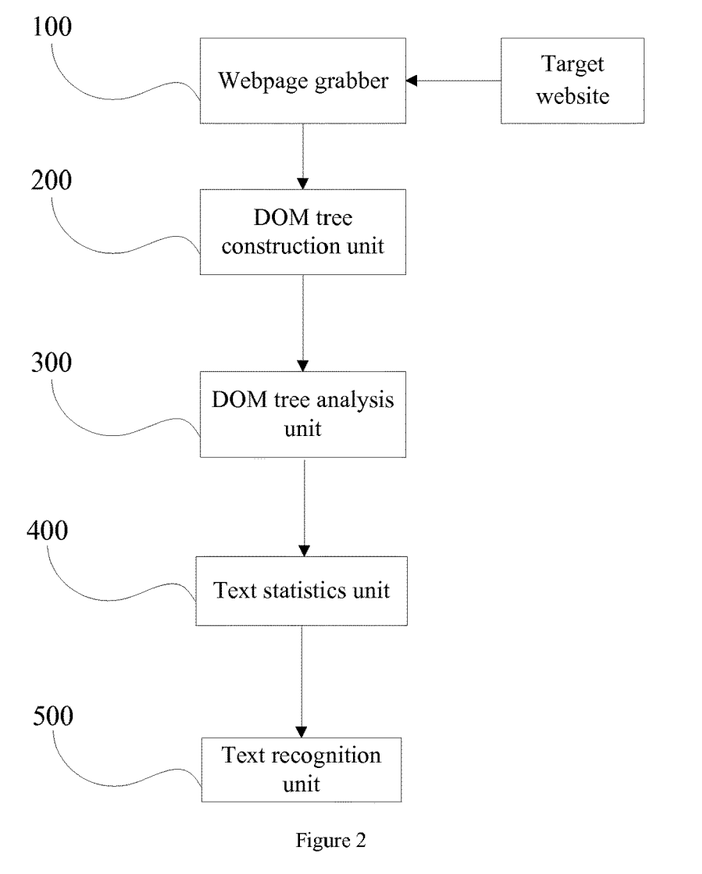
FIG. 2 is a structure diagram of modules of the system for recognizing a non-body text in a webpage according to an embodiment of the invention.

FIG. 2 is a structure diagram of modules of the system for recognizing a non-body text in a webpage in an embodiment of the invention, and as shown in FIG. 2, the system comprises: a webpage grabber 100, a DOM tree construction unit 200, a DOM tree analysis unit 300, a text statistics unit 400 and a text recognition unit 500.

The webpage grabber 100 is configured to grab data of all the webpages of a target website, which may in general adopt the web spider, webpage crawler, search robot, or web crawl script program.

The DOM tree construction unit 200 is configured to construct a DOM tree corresponding to each webpage of the target website. The DOM tree construction unit adopts a parser corresponding to the webpage language, and adopts an HTML parser for an HTML webpage.

The DOM tree analysis unit 300 is configured to find out a unit text section in the webpage according to the DOM tree.

Figure 3:
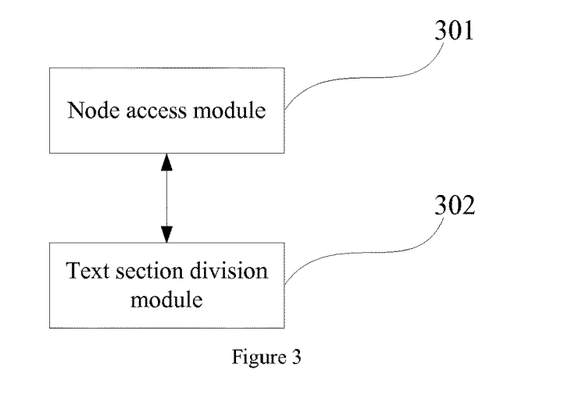
FIG. 3 is a structure diagram of internal modules of the DOM tree analysis unit.

FIG. 3 is a structure diagram of internal modules of the DOM tree analysis unit, and as shown in FIG. 3, the DOM tree analysis unit 300 comprises: a node access module 301 and a text section division module 302.

The node access module 301 is configured to access nodes in the DOM tree in sequence starting from the root node of the DOM tree, and send the accessed current node to the text section division module 302; and configured to judge whether there is still a node needing to be accessed in the DOM tree, and if yes, send the corresponding node as a new current node to the text section division module 302.

Wherein, the node access module 301 may access the nodes in the DOM tree according to the breadth-first algorithm, the depth-first algorithm or other search algorithms. Since when the DOM tree analysis unit 300 determines that the text section corresponding to the current node is a unit text section, it will stop access to the descendant nodes of the current node, the node access module 301 is preferably configured to access the nodes in the DOM tree in sequence according to the breadth-first algorithm, and send the accessed current node to the text section division module 302; and configured to judge whether there is still a node needing to be accessed at the same level as the current node or at a lower level in the DOM tree, and if yes, send the corresponding node at the same level or at a lower level as a new current node to the text section division module 302. Wherein, the breadth-first algorithm is also called the width-first search or the lateral-first search, and is an algorithm in which the nodes of a tree are traversed along the width of the tree from an upper level to a lower level, starting from the root node.

The text section division module 302 is configured to judge whether a text section corresponding to the current node meets the conditions of a unit text section, and when the conditions are met, take the text section corresponding to the current node as a unit text section, and notify the node access module 301 to stop access to the descendant nodes of the current node. Wherein, when the longest path from the current node to its descendant nodes is less than or equal to a predetermined length and the descendant nodes of the current node do not contain a complex node, the text section corresponding to the current node is considered to meet the conditions of a unit text section. The complex node comprises: a node corresponding to the label table, tr, td, ul, ol, frame, select, input, marquee and/or map.

The text statistics unit 400 is configured to conduct statistics on the number of occurrence of the unit text section in all the webpages of the target website.

Figure 4:
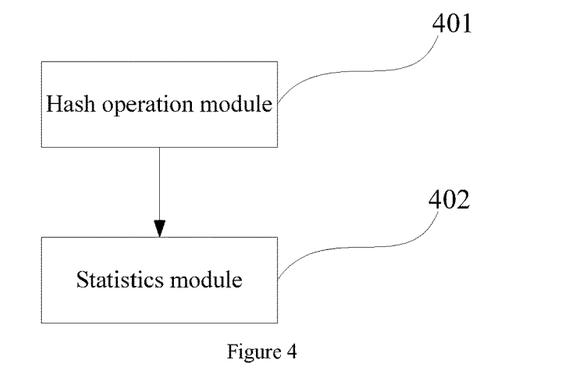
FIG. 4 is a structure diagram of internal modules of the text statistics unit.

FIG. 4 is a structure diagram of internal modules of the text statistics unit, and as shown in FIG. 4, the text statistics unit 400 further comprises: a hash operation module 401 and a statistics module 402.

The hash operation module 401 is configured to perform a hash operation on the unit text section to get a result of key value.

The statistics module 402 is configured to conduct statistics on the number of occurrence of the unit text section in all the webpages of the target website according to the result of key value.

The text recognition unit 500 is configured to judge whether the number of occurrence is greater than a predetermined threshold, and if yes, recognize the unit text section as a non-body text, or otherwise, recognize the unit text section as a body text.

Figure 5:
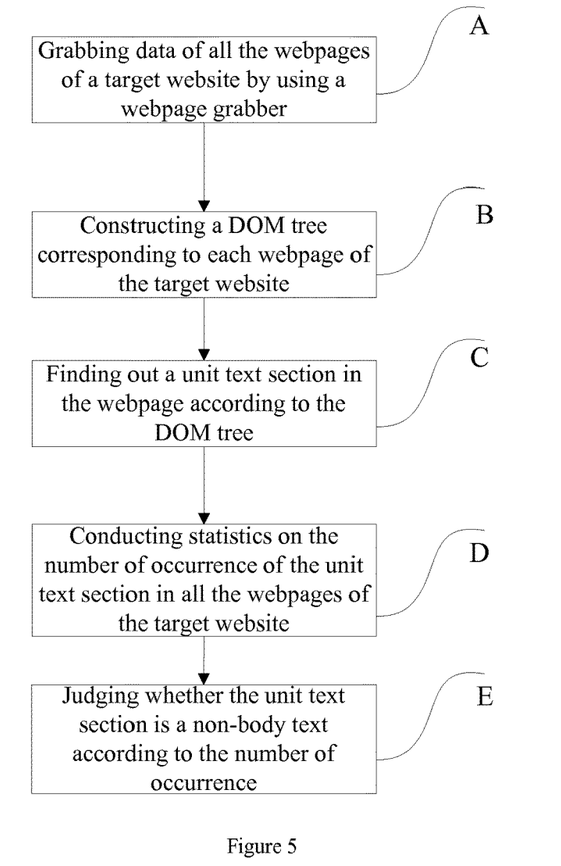
FIG. 5 is a flow chart of the method for recognizing a non-body text in a webpage according to an embodiment of the invention.

FIG. 5 is a flow chart of the method for recognizing a non-body text in a webpage in an embodiment of the invention, and as shown in FIG. 5, corresponding to the system, the method comprises the following steps.

A: grabbing data of all the webpages of a target website by using a webpage grabber. The webpage grabber may in general be the web spider, webpage crawler, search robot, or web crawl script program. The webpage may adopt a markup language such as HTML (Hypertext Markup Language), XML (extensible markup language), XHTML (extensible Hypertext Markup Language), etc., and for simplicity, subsequently an HTML webpage will be taken as an example for illustration. All the webpages herein comprise main webpages and sub-webpages.

Figure 6:
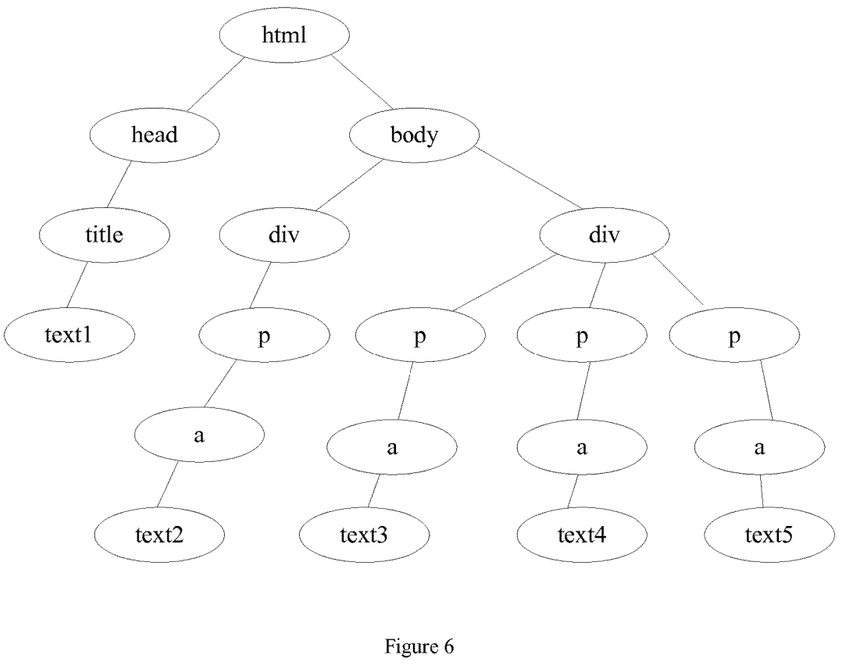
FIG. 6 is a schematic diagram of a DOM tree corresponding to an HTML webpage.

B: constructing a DOM tree corresponding to each webpage of the target website. In the embodiment, a DOM tree corresponding to each webpage of the target website is constructed adopting an HTML parser, and it will be readily envisioned by those skilled in the art that when the webpage adopts other markup language, a corresponding parser may be adopted, for example, an XML parser is adopted to construct a DOM tree corresponding to an XML webpage. FIG. 6 is a schematic diagram of a DOM tree corresponding to an HTML webpage, and as shown in FIG. 6, a node in the DOM tree corresponds to a label or text in an HTML code.

C: finding out a unit text section in the webpage according to the DOM tree.

Figure 7:
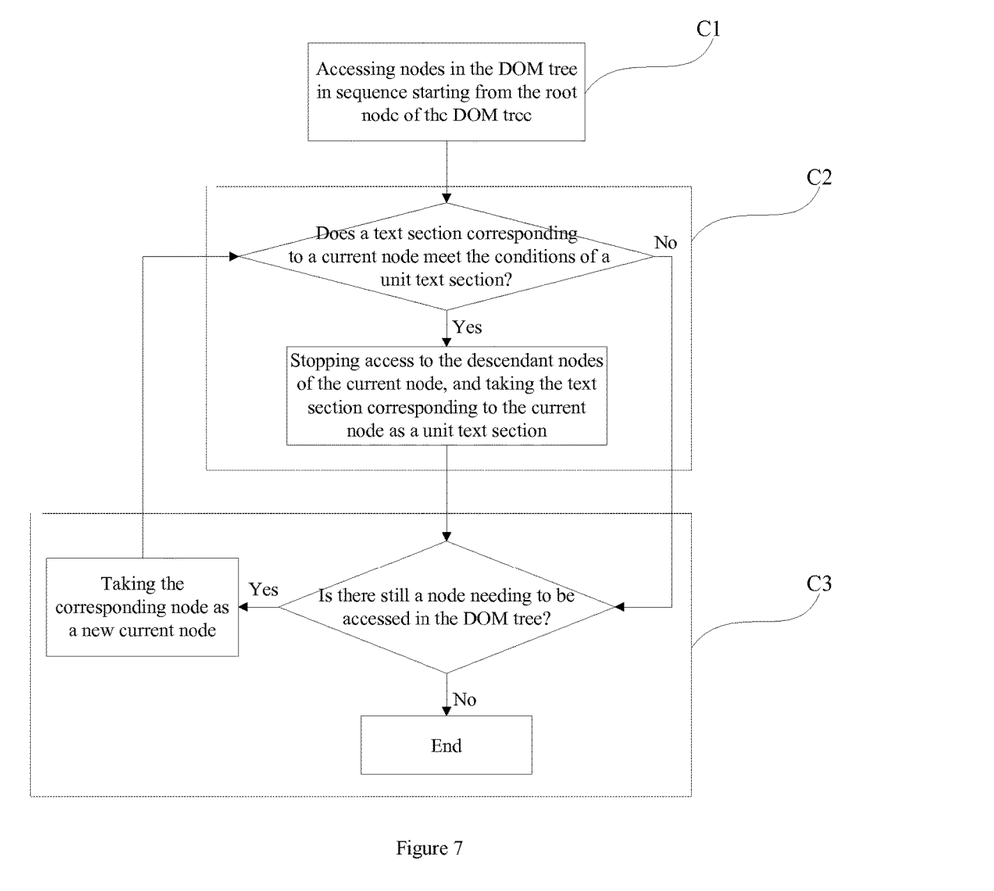
FIG. 7 is a flow chart of the step C.

FIG. 7 is a flow chart of the step C, and as shown in FIG. 7, in the step C the following steps are particularly comprised.

C1: nodes in the DOM tree are accessed in sequence starting from the root node of the DOM tree.

C2: it is judged whether a text section corresponding to a current node meets the conditions of a unit text section, and if yes, access to the descendant nodes of the current node is stopped, the text section corresponding to the current node is taken as a unit text section, and the step C3 is performed; otherwise, the step C3 is directly performed.

The step C2 particularly comprises the following steps.

C21: it is judged whether the current node meets the following conditions: the longest path from the current node to its descendant nodes is less than or equal to a predetermined length, and the descendant nodes of the current node do not contain a complex node; and if yes, the step C22 is performed; otherwise, the step C3 is performed. The meaning of this step is that, when the current node concurrently meets that the longest path from the current node to its descendant nodes is less than or equal to a predetermined length, and the descendant nodes of the current node do not contain a complex node, the text section corresponding to the current node is taken as a unit text section.

Still taking FIG. 6 as an example, in FIG. 6, the distance between the left div node and its farthest descendant node is 3, which is less than the predetermined distance of 4, and at the same time, its descendant nodes do not contain the complex node, therefore, the text section corresponding to the left div node in FIG. 6 is recognized as a unit text section. It needs to be noted that the recognition of the unit text section is independent of the label name of the current node.

The descendant nodes comprise individual offspring nodes of the current node, i.e., all the nodes on the branch where the current node is located and at a lower level(s) under the current node. The setting of the predetermined length and the range of the nodes comprised in the complex nodes may be timely adjusted according to the actual usage. For example, the predetermined length may be set to be 3, or 4, or 5, and in the embodiment, the predetermined length is preferably 4. Still taking the DOM in FIG. 6 as an example, for the left div node in FIG. 6, when it is taken as the current node, its corresponding branch is div→p→a-→text2, and the distance from this div node to its farthest descendant node text2 is 3, which is less than the predetermined length of 4. In this embodiment, the complex node comprises: a node corresponding to the label table, tr, td, ul, ol, frame, select, input, marquee and/or map.

C22: access to the descendant nodes of the current node is stopped, the text section corresponding to the current node is taken as a unit text section, and the step C3 is performed.

C3: it is judged whether there is still a node needing to be accessed in the DOM tree, and if yes, the corresponding node is taken as a new current node, and the step C2 is performed; otherwise, the step D is performed.

In the step C1, the nodes in the DOM tree may be accessed by adopting the breadth-first algorithm, the depth-first algorithm or other search algorithms. Since when the method of the embodiment of the invention determines that the text section corresponding to the current node is a unit text section, it will stop access to the descendant nodes of the current node, preferably the breadth-first algorithm is adopted in the step C1.

When in the step C1, the nodes in the DOM tree are accessed in sequence according to the breadth-first algorithm, the step C3 particularly comprises the following steps.

C31: it is judged whether there is still a node not having been accessed at the same level as the current node in the DOM tree, and if yes, the node at the same level is taken as a new current node, and the step C2 is performed; otherwise, the step C32 is performed. The node at the same level refers to a node at the same level as the current node, which may be a brother node of the current node, or also be a non-brother node (as shown in FIG. 6, the node text2 and the node text3 are nodes at the same level, but not brother nodes).

C32: it is judged whether there is still a node needing to be accessed at a lower level under the current node in the DOM tree, and if yes, the node at a lower level is taken as a new current node, and the step C2 is performed; otherwise, the step D is performed. It needs to be noted that, when the text section corresponding to the current node is recognized as a unit text section, the descendant nodes of the current node do not need to be accessed again.

D: conducting statistics on the number of occurrence of the unit text section in all the webpages of the target website.

Figure 8:
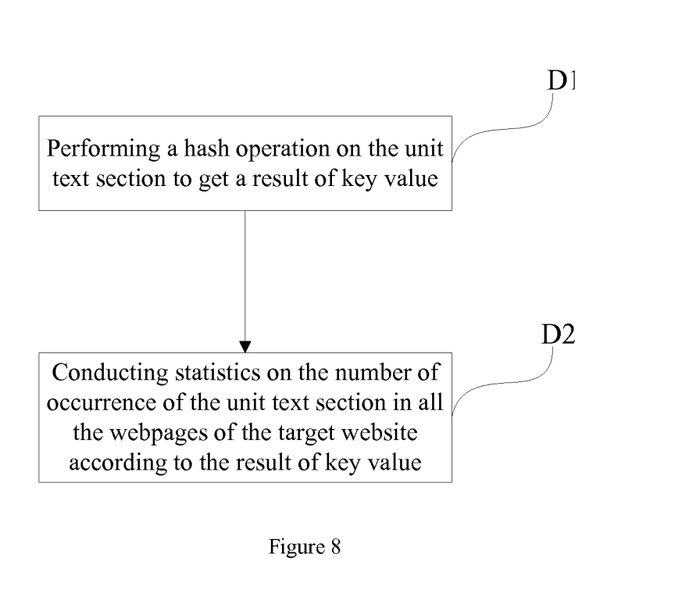
FIG. 8 is a flow chart of the step D.

FIG. 8 is a flow chart of the step D, and as shown in FIG. 8, the step D particularly comprises the following steps.

D1: a hash operation is performed on the unit text section to get a result of key value. In the embodiment, the MD5 algorithm (Message Digest Algorithm 5) is adopted to perform a hash operation on the unit text section, and of course, it may be readily envisioned by the skilled in the art that other similar algorithms may also be utilized to perform a hash operation. In the embodiment, when statistics is conducted on the number of occurrence, a key-value table with the result of key value as a key and the number of occurrence as a value is established, and in turn, it is judged whether the value of a "value" corresponding to the value of each "key" is greater than the predetermined threshold according to the key-value table, so as to recognize whether a unit text section corresponding to the value of each "key" is a non-body text.

D2: statistics is conducted on the number of occurrence of the unit text section in all the webpages of the target website according to the result of key value.

E: judging whether the unit text section is a non-body text according to the number of occurrence. The step E particularly comprises the step of judging whether the number of occurrence is greater than the predetermined threshold, and if yes, recognizing the unit text section as a non-body text; or otherwise, recognizing the unit text section as a body text.

Figure 9:
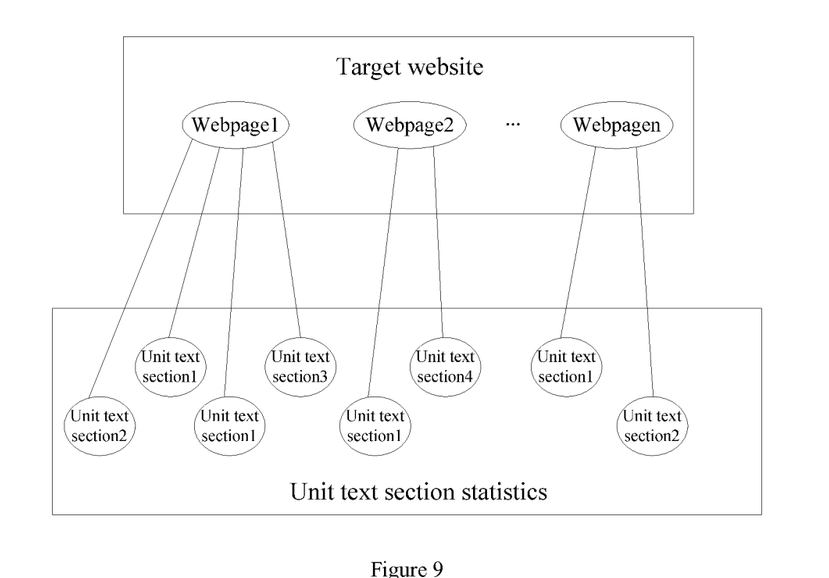
FIG. 9 is a schematic diagram of the statistics principle of a unit text section.

FIG. 9 is a schematic diagram of the statistics principle of a unit text section, and as shown in FIG. 9, the statistical range of the number of occurrence of a respective one of the unit text sections is all the webpages of the target website. Therein, the predetermined threshold may be adjusted according to the actual usage, for example, the predetermined threshold may preferably be 100, or 90, 150, etc.

In the system and method for recognizing a non-body text in a webpage in the embodiments of the invention, a DOM tree is adopted to obtain a unit text section of each webpage, statistics is in turn conducted on the number of occurrence of the unit text section in a target website, and its number of occurrence is compared with a predetermined threshold, thereby recognizing a non-body text in the website, which overcomes the problem of lag of recognition of a non-body text in the prior art method, has a high recognition accuracy, and has a wide application prospect in search engines.

Embodiments of the individual components of the invention may be implemented in hardware, or in a software module running on one or more processors, or in a combination thereof. It will be appreciated by those skilled in the art that, in practice, some or all of the functions of some or all of the components in a system for recognizing a non-body text in a webpage according to individual embodiments of the invention may be realized using a microprocessor or a digital signal processor (DSP). The invention may also be implemented as an apparatus or device program (e.g., a computer program and a computer program product)

for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 10:
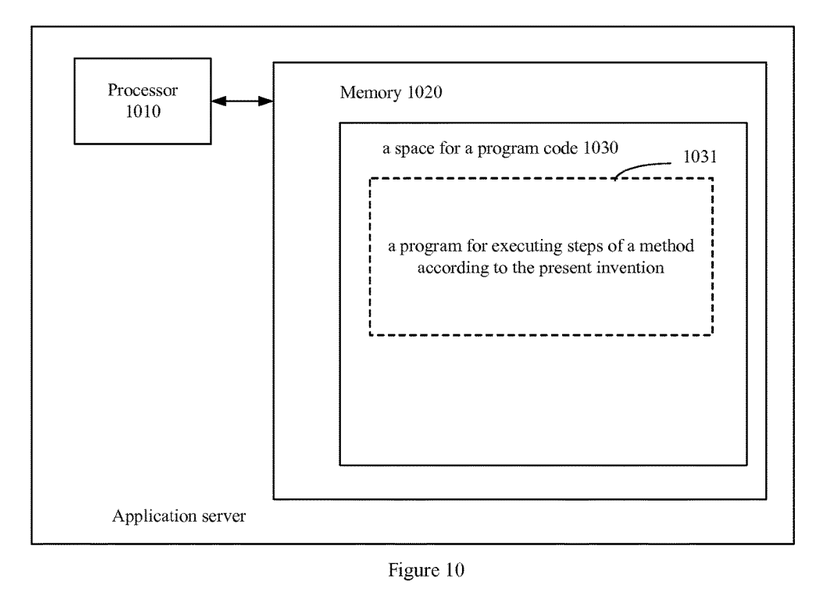
FIG. 10 shows schematically a block diagram of a server for performing a method according to the invention.
Figure 11:
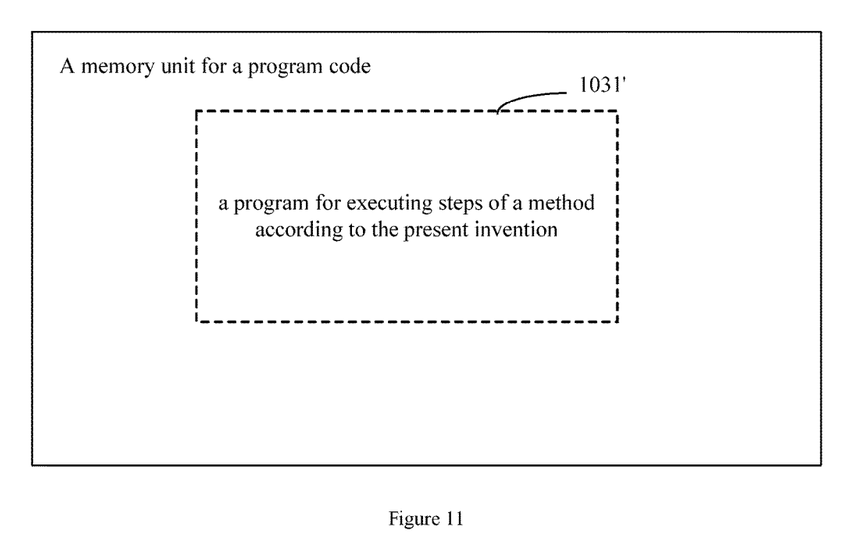
FIG. 11 shows schematically a storage unit for retaining or carrying a program code implementing a method according to the invention.

For example, FIG. 10 shows a server which may carry out a method for recognizing a non-body text in a webpage according to the invention, e.g., an application server. The server traditionally comprises a processor 1010 and a computer program product or a computer readable medium in the form of a memory 1020. The memory 1020 may be an electronic memory such as a flash memory, an EEPROM (electrically erasable programmable read-only memory), an EPROM, a hard disk or a ROM. The memory 1020 has a memory space 1030 for a program code 1031 for carrying out any method steps in the methods as described above. For example, the memory space 1030 for a program code may comprise individual program codes 1031 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 11. The storage unit may have a memory segment, a memory space, etc. arranged similarly to the memory 1020 in the server of FIG. 10. The program code may for example be compressed in an appropriate form. In general, the storage unit comprises a computer readable code 1031', i.e., a code which may be read by e.g., a processor such as 1010, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. An apparatus for recognizing non-body text in a webpage, comprising:
    a memory having instructions stored thereon; and
    at least one processor to execute the instructions to perform operations comprising:
        grabbing data associated with one or more webpages of a target website;
        constructing one or more Document Object Model (DOM) trees corresponding to the one or more webpages of the target website;
        for each particular DOM tree of the one or more DOM trees:
            accessing nodes in the particular DOM tree in sequence starting from a root node of the particular DOM tree according to a breadth-first algorithm or a depth-first algorithm,
            for a current node in the access sequence having a corresponding text section, determining a longest path from the current node to descendant nodes of the particular DOM tree, and comparing the longest path to a predetermined length,
            determining whether the descendant nodes of the current node contain a complex node, wherein the complex node comprises a node corresponding to at least one of a label table, tr, td, ul, ol, frame, select, input, marquee, and map,
            when the longest path is less than or equal to the predetermined length and the descendant nodes of the current node do not contain the complex node, determining the text section corresponding to the current node as a unit text section, and
            determining whether there is at least one node remaining in the particular DOM tree to be accessed by the access sequence, and when there is at least one node to be accessed, determining the at least one node to be accessed as a new current node;
        counting a number of occurrences of the determined unit text section in the one or more DOM trees corresponding to the one or more webpages of the target web site;
        determining whether a unit text section having particular content among the one or more DOM trees is non-body text according to the number of occurrences of the unit text section having the particular content in the one or more DOM trees, wherein, when the number of occurrences of the unit text section exceeds a predetermined threshold, the unit text section is determined as the non-body text, and
        displaying the one or more webpages of the target website by excluding the determined non-body text.

2. The apparatus as claimed in claim 1, wherein the constructing comprises constructing the DOM tree corresponding to each webpage of the target website by adopting a parser corresponding to a webpage language.

3. The apparatus as claimed in claim 1, wherein the accessing nodes comprises accessing the nodes in the DOM tree in sequence according to the breadth-first algorithm;
    the determining whether there is the at least one node to be accessed comprises:

determining whether there is a node not having been accessed at a same level as the current node in the DOM tree, and when there is at least one node to be accessed, determining the at least one node at the same level as another new current node; and determining whether there is another node to be accessed at a lower level under the current node in the DOM tree, and when there is the at least one other node to be accessed, determining the node at the lower level as the another new current node.

4. The apparatus as claimed in claim 1, wherein the counting comprises:

performing a hash operation on the unit text section to get a result of a key value; and counting the number of occurrences of the unit text section in the webpages of the target website according to the result of the key value.

5. A method for recognizing non-body text in a webpage, comprising:

grabbing, by at least one processor, data associated with one or more webpages of a target website by using a webpage grabber;

constructing, by the at least one processor, one or more Document Object Model (DOM) trees corresponding to the one or more webpages of the target website;

for each particular DOM tree of the one or more DOM trees:

accessing, by the at least one processor, nodes in the DOM tree in sequence starting from a root node of the particular DOM tree according to a breadth-first algorithm or a depth-first algorithm, for a current node in the access sequence having a corresponding text section, determining, by the at least one processor, a longest path from the current node to descendant nodes of the particular DOM tree, and comparing the longest path to a predetermined length, determining, by the at least one processor, whether the descendant nodes of the current node contain a complex node, wherein the complex node comprises a node corresponding to at least one of a label table, tr, td, ul, ol, frame, select, input, marquee, and map, when the longest path is less than or equal to the predetermined length and the descendant nodes of the current node do not contain the complex node, determining, by the at least one processor, the text section corresponding to the current node as a unit text section, and determining, by the at least one processor, whether there is at least one node remaining in the particular DOM tree to be accessed by the access sequence, and when there is at least one node to be accessed, determining the at least one node to be accessed as a new current node;

counting, by the at least one processor, a number of occurrences of the determined unit text section in the one or more DOM trees corresponding to the one or more webpages of the target web site;

determining, by the at least one processor, whether a unit text section having particular content among the one or more DOM trees is non-body text according to the number of occurrences of the unit text section having the particular content in the one or more DOM trees, wherein, when the number of occurrences of the unit text section exceeds a predetermined threshold, the unit text section is determined as the non-body text, and displaying the one or more webpages of the target website by excluding the determined non-body text.

6. The method as claimed in claim 5, wherein the constructing comprises constructing the DOM tree corresponding to each webpage of the target website by adopting a parser corresponding to a webpage language.

7. The method as claimed in claim 5, wherein in the accessing nodes, the nodes in the DOM tree are accessed in sequence according to the breadth-first algorithm;

the determining whether there is the at least one node to be accessed comprises:

determining whether there is a node not having been accessed at a same level as the current node in the DOM tree, and when there is at least one node to be accessed, determining the at least one node at the same level as another new current node; and determining whether there is another node to be accessed at a lower level under the current node in the DOM tree, and when there is the at least one other node to be accessed, determining the node at the lower level as the another new current node.

8. The method as claimed in claim 5, wherein the counting comprises:

performing a hash operation on the unit text section to get a result of a key value; and counting the number of occurrences of the unit text section in the webpages of the target website according to the result of the key value.

9. A non-transitory computer readable medium having instructions stored thereon that, when executed by at least one processor, cause the at least one processor to perform operations for recognizing non-body text in a webpage, comprising:

grabbing data associated with one or more webpages of a target website by using a webpage grabber;

constructing one or more Document Object Model (DOM) trees corresponding to the one or more webpages of the target website;

for each particular DOM tree of the one or more DOM trees:

accessing nodes in the particular DOM tree in sequence starting from a root node of the particular DOM tree according to a breadth-first algorithm or a depth-first algorithm, for a current node in the access sequence having a corresponding text section, determining a longest path from the current node to descendant nodes of the particular DOM tree, and comparing the longest path to a predetermined length, determining whether the descendant nodes of the current node contain a complex node, wherein the complex node comprises a node corresponding to at least one of a label table, tr, td, ul, ol, frame, select, input, marquee, and map, when the longest path is less than or equal to the predetermined length and the descendant nodes of the current node do not contain the complex node, determining a text section corresponding to the current node as a unit text section, and determining whether there is at least one node remaining in the particular DOM tree to be accessed by the access sequence, and when there is at least one node to be accessed, determining the least one node to be accessed as a new current node;

counting a number of occurrences of the determined unit text section in the one or more DOM trees corresponding to the one or more webpages of the target website;

determining whether a unit text section having particular content among the one or more DOM trees is non-body text according to the number of occurrences of the unit text section having the particular content in the one or more DOM trees, wherein, when the number of occurrences of the unit text section exceeds a predetermined threshold, the unit text section is determined as the non-body text, and displaying the one or more webpages of the target website by excluding the determined non-body text.

* * * * *